United States Patent [19]

Molnar et al.

[11] Patent Number: 5,995,568
[45] Date of Patent: Nov. 30, 1999

[54] METHOD AND APPARATUS FOR PERFORMING FRAME SYNCHRONIZATION IN AN ASYMMETRICAL DIGITAL SUBSCRIBER LINE (ADSL) SYSTEM

[75] Inventors: Peter R. Molnar; Jeffrey P. Gleason, both of Austin, Tex.

[73] Assignee: Motorola, Inc., Schaumburg, Ill.

[21] Appl. No.: 08/740,176

[22] Filed: Oct. 28, 1996

[51] Int. Cl.⁶ .............................. H04L 7/00; H04L 25/36; H04J 1/14; H04J 3/06
[52] U.S. Cl. .................... 375/354; 375/355; 375/371; 370/495; 370/503; 370/509
[58] Field of Search ................... 375/354, 355, 375/364, 365, 368, 371, 373, 374; 370/495, 503, 509, 510, 512, 513, 514, 515, 516

[56] References Cited

U.S. PATENT DOCUMENTS

| | | | |
|---|---|---|---|
| 5,285,474 | 2/1994 | Chow et al. ............................... | 375/13 |
| 5,398,263 | 3/1995 | Vanderspool, II et al. ............. | 375/376 |
| 5,479,447 | 12/1995 | Chow et al. ............................ | 375/260 |
| 5,625,651 | 4/1997 | Cioffi ....................................... | 375/354 |
| 5,627,863 | 5/1997 | Aslanis et al. ........................... | 375/357 |

OTHER PUBLICATIONS

Chow, et al.; "Equalizer Training Algorithms for Multicarrier Modulation Systems"; IEEE Int'l Conf on Communications '93; May 23–26 in Geneva; Tech Prog, Conf Record, vol. 2/3; pp. 761–765.

*Primary Examiner*—Chi H. Pham
*Assistant Examiner*—Khai Tran
*Attorney, Agent, or Firm*—Sandra L. Godsey

[57] ABSTRACT

A method and apparatus for performing DMT frame synchronization in an ADSL system begins by providing a training signal (82) to a receiver of the ADSL system (34). The training signal (82) is processed to result in a desired impulse response. The impulse response is used to reduce inter-symbol interference between time-adjacent DMT frames (100–108). The desired impulse response is used to calculate a frame misalignment value ($\Delta T$). The frame misalignment value ($\Delta T$) of the desired impulse response (84) is then utilized to adjust an internal counter of the receiver to perform frame alignment. The use of the training signal (82) and impulse response (84) to provide for both intersymbol interference reduction (FIG. 5) and frame synchronization (FIG. 8) provides for fast ADSL initialization.

19 Claims, 5 Drawing Sheets

METHOD AND APPARATUS FOR PERFORMING FRAME SYNCHRONIZATION IN AN ASYMMETRICAL DIGITAL SUBSCRIBER LINE (ADSL) SYSTEM

FIELD OF THE INVENTION

The present invention relates generally to communication systems, and more particularly to performing frame synchronization in an asymmetrical digital subscriber line (ADSL) communication system.

BACKGROUND OF THE INVENTION

In order to make high data rate interactive services, such as video conference communication, more globally available there is a need for high speed data communications. One method of communication is called asymmetrical digital subscriber line (ADSL). Asymmetrical digital subscriber line (ADSL) is a transmission scheme that allows for the use of plain old telephone service (POTS) and a variety of digital channels on two-wire twisted metallic wire pair with mixed gauges. The facility of using twisted wire is in the availability of the existing infrastructure (i.e. the telephone lines), the dual use of which allows for reduced installation costs. For ADSL communications, technology standards have been adopted and are defined in the American National Standard for Telecommunication-Network and Customer Interfaces-Asymmetric Digital Subscriber Line (ADSL) Metallic Interface, T1. 413-1995, ADSL coding standard, adopted Aug. 18, 1995.

One of the advantages of ADSL transmission is that it may be used to provide high quality, multiple and simultaneous interactive video services over an ordinary telephone line without disruption of the standard telephone service. The growing popularity of in-home entertainment, computation, and business coupled with the availability of existing infrastructure makes ADSL an important communication transmission method.

One method of modulation used in an ADSL communication system is the discrete multi-tone (DMT) modulation method. The DMT method transmits data on several frequency carriers, in contrast to more traditional single carrier modulation methods. DMT divides the available bandwidth into several smaller bands, each centered around one carrier frequency. Each carrier frequency is modulated with data such that each carrier frequency communicates data parallel in time. In other words, each modulated carrier is added together and the resulting frame is transmitted on the same physical line.

DMT modulation is especially useful for transmitting data on telephone lines, where line attenuation and noise characteristics may vary drastically as a function of frequency. Since DMT is essentially made up of several independent carriers, carriers operating at those frequencies having the greatest signal-to-noise ratio (SNR) carry many bits of transmission information, while carriers suffering greater attenuation and/or noise carry very few or no bits of transmission information. The DMT method allows the full capacity of the channel to be realized in an operable manner.

One of the requirements of ADSL transmission is that the receiver performs a synchronization to the incoming frames. A receiver typically is required to determine the point at which one frame ends and the next frame begins. Frame synchronization is defined as aligning the receiver's frame boundary optimally to the incoming data frame. There are many methods of performing synchronization incorporating a variety of algorithms and circuitry.

Specifically in DMT transmission, each frame is sampled several times by the receiver, often equaling twice the number of carriers. Typically, a phase lock loop (PLL) will lock the sampling clock optimally to the received data. The problem arises in determining which received sample is to be counted as the first sample in a frame. The starting point of a frame is unknown to the receiver and must be determined. Correlating the received data with the known transmitted data is one method of determining an optimal frame alignment. There are a variety of methods, but many synchronization solutions are costly and time consuming. The problem exists in ADSL communication systems of performing both inter-symbol interference reduction and frame alignment in a cost efficient, timely manner.

DESCRIPTION OF A PREFERRED EMBODIMENT

General

In the following description, numerous specific details are set forth such as specific timing, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. Specifically, it should be noted that a frame may also be referred to as a symbol, and the terms are used interchangeably in the following discussion.

It will be appreciated that for simplicity and clarity of illustration, elements illustrated have not necessarily been drawn to scale. For example, the dimensions of some of the elements are exaggerated relative to other elements for clarity. Further, where considered appropriate, reference numerals have been repeated to indicate corresponding or analogous elements.

Operation

Generally, the present invention provides a method for synchronizing discrete multi-tone (DMT) frames in an asymmetric digital subscriber line (ADSL) system in a time saving manner. Prior art applications typically have one stage which performs interference reduction and the results of that stage are then synchronized with the in-coming signals. In one embodiment of the present invention, the first stage, inter-symbol interference reduction, uses a time domain equalizer (TEQ) training algorithm. The training algorithm is used iteratively for training the equalizer and requires that roughly 780,000 frame samples be taken on an incoming training signal. Note that alternate embodiments of the present invention may apply other to training algorithms. The TEQ method is given herein, as an exemplar of training methods consistent with the present invention.

One embodiment of the present invention uses the time domain equalizer (TEQ) training algorithm to train the signal equalizer such that a resulting impulse response will have a width of less than 33 samples in the time domain. The width of the impulse response is considered a window. By maintaining such a window, inter-symbol interference is kept within a given specification.

A preferred example of the TEQ algorithm is described in detail in U.S. Pat. No. 5,285,474 entitled "METHOD FOR EQUALIZING A MULTICARRIER SIGNAL IN A MULTICARRIER COMMUNICATION SYSTEM" by Chow, et al., issued Feb. 8, 1994, and in a technical paper presented at the 1993 IEEE International Conference on Communications ICC '93 entitled "Equalizer Training Algorithms for Multicarrier Modulation Systems" by J. S. Chow, et al. of Amati Communications Corp. of Palo Alto, Calif.

In one embodiment of the present invention, a training sequence is sent through a distorting channel, such as the telephone line, to the receiver. The TEQ training algorithm trained equalizer equalizes the distorted multi-carrier data signal transmitted through the distorting channel. Equalizer parameters are iteratively adjusted against a desired impulse response to obtain a minimum error. The training process is repeated until a predetermined convergence condition is detected.

Note that the equalizer trained by the TEQ training algorithm does not synchronize the frames. Synchronization is typically performed subsequent to equalization. One method of performing frame synchronization is to correlate the transmitted frame with the received frame and thereby locate the frame boundary. This correlation is performed in addition to the TEQ inter-symbol interference reduction performed by Chow et al. This additional correlation used for frame alignment takes the form of the equation:

$$c(\Delta) = \sum_{i=0}^{N-1} x_i y_{i-\Delta}, \quad \Delta = 0, 1, 2, 3, \ldots, N-1$$

where "c" is the correlation as a function of frame misalignment, $\Delta$, and "N" is the number of samples per frame, where N is typically 512 and the number of frequency carriers is usually 250. In the above calculation, "x" is the transmitted training signal, and "y" is the equalized received training signal.

Many synchronization solutions such as that described above are costly and time consuming. As an example, for the 512 sample frame typically used in ADSL transmission, such a correlation would take approximately 260,000 multiply/accumulate operations in a DSP processor. In other words, after the inter-symbol interference reduction algorithm is completed, the prior art consumes up to 260,000 clock cycles to perform DMT frame synchronization in addition to the inter-symbol interference reduction. The present invention provides a method of performing interference reduction and frame synchronization in less than the 260,000 clocks required of other methods.

In the algorithms taught herein, frame synchronization is performed in conjunction with the algorithm used to perform inter-symbol interference reduction. In this way, frame alignment information gained in the inter-symbol interference reduction is not wasted. By combining inter-symbol interference reduction and frame synchronization into a more unified algorithm, hundreds of thousands of clock cycles can be saved in the initialization sequence of an ADSL communication. The figures and corresponding text contained herein illustrate a method of synchronizing DMT data frames in an ADSL system in a manner much faster than that available in methods which perform these functions separately.

Figure 1:
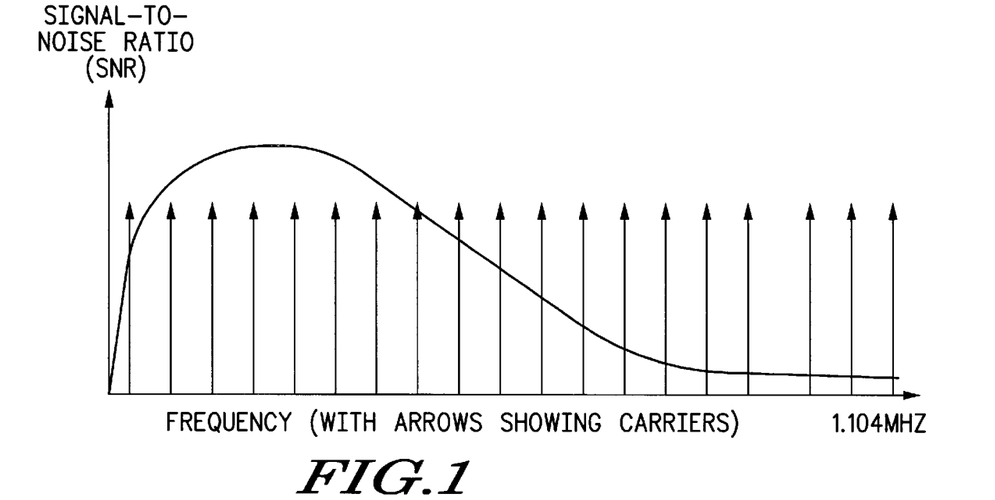
FIG. 1 illustrates a plot of the signal-to-noise ratio curve associated with a plurality of discrete frequency carriers in a discrete multi-tone (DMT) asymmetric digital subscriber line (ADSL) system as a function of frequency, in accordance with one embodiment of the present invention.

The invention can be further understood with reference to FIGS. 1–8 contained herein. FIG. 1 illustrates a discrete multi-tone (DMT) system which allows high speed communication of computer data along ordinary copper telephone lines. To allow a high rate of data transfer, data is transferred in parallel during a same time period on a plurality of different frequency carriers as illustrated in FIG. 1. In a typical ADSL system, 250 frequency carriers are utilized. In one embodiment corresponding to that illustrated in FIG. 1, a low frequency carrier would be roughly 25 kHz while a high frequency carrier would be roughly 1.1 MHz. Between the 25 kHz and the 1.10 MHz carriers are a total of 250 evenly spaced frequency carriers which can each communicate one or more bits in a same time period.

FIG. 1 also illustrates a "bell-shaped" signal-to-noise ratio (SNR) curve. For any connection between two telecommunication points, it is possible to determine the signal-to-noise ratio of the signal received at the receiver. In certain portions of the frequency range, the signal-to-noise ratio will be excellent, indicating only minimal distortion and noise. In other portions of the frequency spectrum the signal-to-noise ratio will be poor, indicating that distortion and noise are significant. Relating the frequency carriers of FIG. 1 to FIG. 2, a signal-to-noise ratio curve has been superimposed on both, and carrier frequencies coincident with high portions of the signal-to-noise ratio curve can effectively carry more bits of data or transmission information than those frequencies coincident with the lower portions of the signal-to-noise ratio curve.

Figure 2:
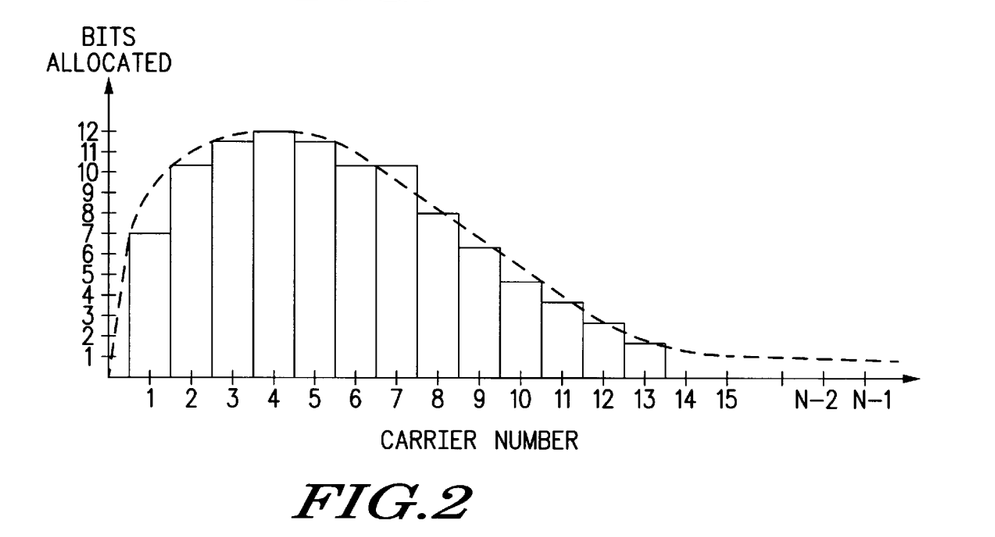
FIG. 2 illustrates a plot of an allocation of the number of transmission bits, associated with each of the plurality of discrete frequency carriers of FIG. 1, as a function of carrier frequency and optimized according to the signal-to-noise ratio curve, in accordance with one embodiment of the present invention.

FIG. 2 illustrates how bits are assigned to specific frequency carriers according to their corresponding signal-to-noise ratio in a DMT type system. As can be seen from FIG. 2, frequency carriers which correspond to higher signal-to-noise ratios can carry more bits of information per time period than those frequency carriers which are associated with low signal-to-noise ratios. In ADSL systems, a maximum of 15 bits per frequency carrier can be communicated in any given time period. Therefore, FIG. 2 illustrates a DMT frame or a DMT symbol in accordance with the ADSL standard referenced herein above. Once binary information is assigned to frequency carriers as illustrated in FIG. 2, the data is transmitted on the frequency carriers for a 250 microsecond time period. Every 250 microseconds, a different set of binary values is assigned to frequency carriers and transmitted along the copper telephone line. Receivers must extract the data from the frequency carriers in the 250 microseconds allowed for that particular frame. This time serial communication of DMT frames or DMT symbols is illustrated in FIG. 3.

Figure 3:
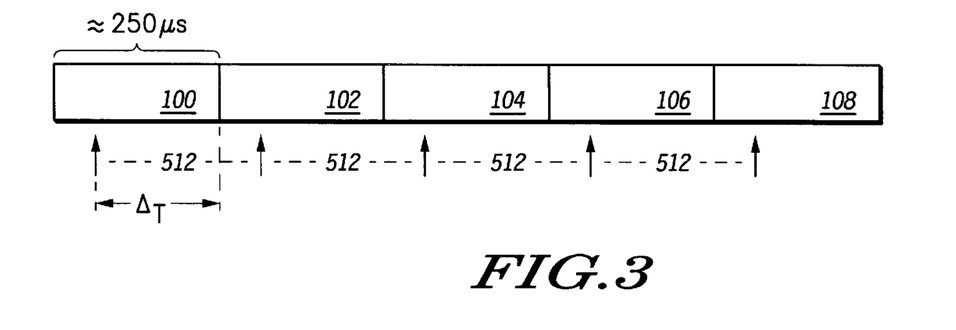
FIG. 3 illustrates, in block diagram form, DMT frames or DMT symbols of FIG. 2, wherein these frames are to be transmitted in a time-sequential manner, in accordance with one embodiment of the present invention.

In FIG. 3, five distinct time sequential DMT frames 100, 102, 104, 106, and 108 are illustrated, each of which is roughly 250 microseconds long. Time delays exist in the telephone lines. Additionally, there is a lack of synchronization between the transmitters, which are sending the information, and the receivers, which are receiving the information, with respect to the clocks and counters associated with each. Time delays and lack of synchronization in an ADSL system result in the misalignment of incoming DMT frames at the receiver and thus the misalignment of the receiver circuitry sampling of the data in these frames.

The arrows in FIG. 3 illustrate the positions at which sampling is initiated in an ADSL receiver. As can be seen from FIG. 3, there is a time period delta $\Delta_T$ between the initial receiver starting point for frame 100 and the starting point for the incoming frame 102. Contained in each DMT frame 100, 102, 104, 106, and 108 are 512 samples of received data. Since the sampling is done sequentially, if frame 100 is misaligned, all the subsequent will also be misaligned. In one embodiment, in ADSL system, the present invention provides the receiver a time efficient solution for aligning the starting point of a sampling sequence to the incoming boundary of the DMT frames provided via ordinary telephone lines.

Figure 4:
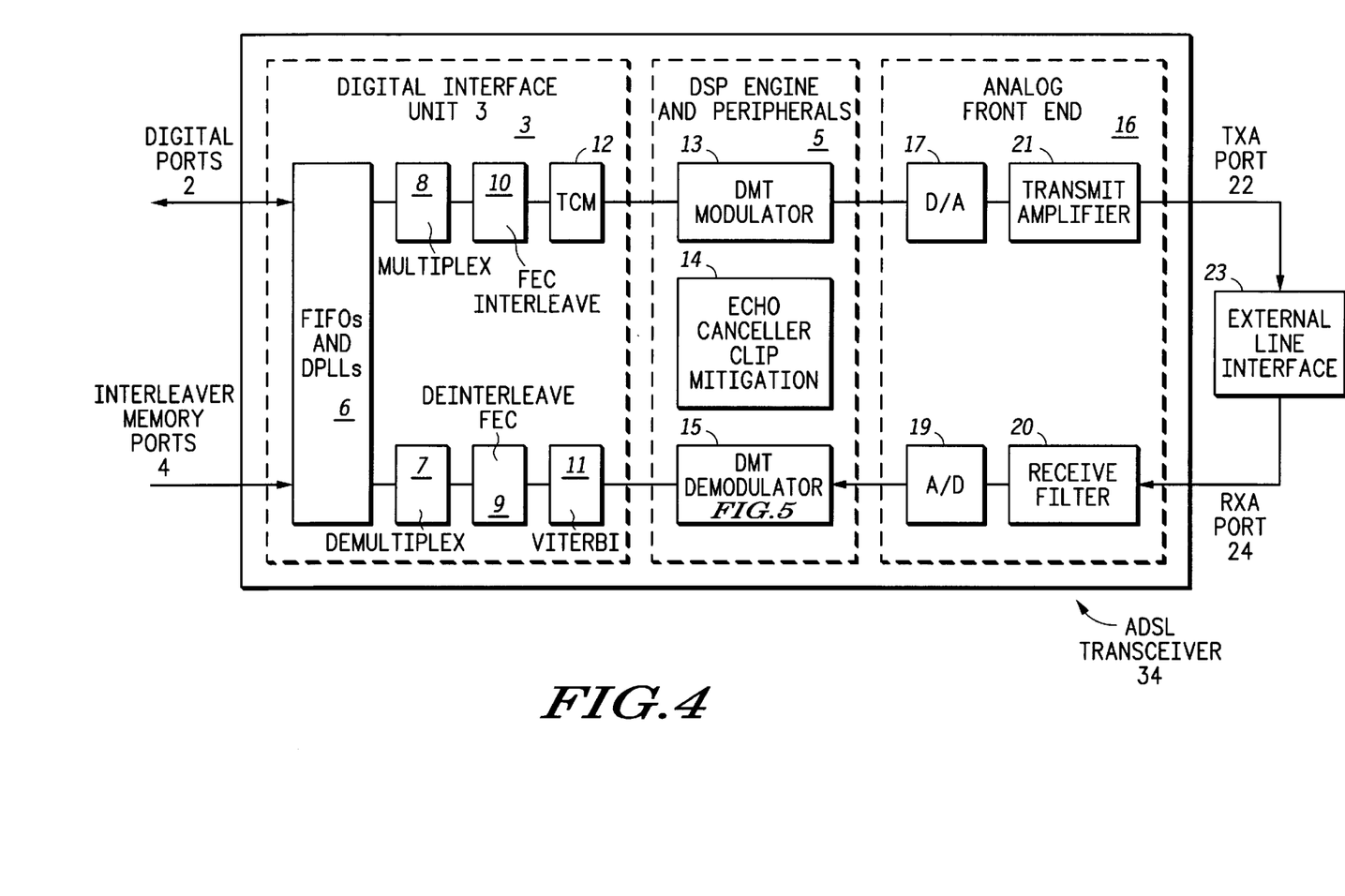
FIG. 4 illustrates, in block diagram form, an ADSL transceiver used to time-sequentially transmit the DMT frames or DMT symbols of FIG. 3, in accordance with one embodiment of the present invention.

FIG. 4 illustrates an ADSL transceiver 34 according to one embodiment of the present invention. Here, ADSL transceiver 34 may be a single chip embodiment and may be used as a receiver. Referring to FIG. 4, ADSL transceiver 34 includes digital interface unit 3, which is coupled to digital signal processing (DSP) engine and peripherals 5 and analog front end 16. Digital interface unit 3 is bi-directionally coupled to digital ports 2 and bi-directionally coupled to memory ports 4.

Analog front end 16 contains analog-to-digital (A/D) converter 19 which is coupled to receive filter 20. Analog front end 16 further includes transmit amplifier 21 which is coupled to digital-to-analog (D/A) converter 17. Transmit amplifier 21 is further coupled to port 22. Receive filter 20 is coupled to port 24. Port 22 is then coupled to external line interface 23. External line interface 23 is coupled to port 24.

Continuing with FIG. 4, digital interface unit 3 also includes FEC (forward error correction) interleave 10 which is coupled to TCM (trellis code modulation) 12, multiplex 8 which is coupled to FEC interleave 10, de-interleave FEC 9 which is coupled to Viterbi 11, and demultiplex 7 which is coupled to de-interleave FEC 9. These modules are consistent with standard digital interface units known in the art. Digital interface unit 3, however, further includes FIFOs and DPLLs 6 which is coupled to both multiplex 8 and demultiplex 7, where FIFOs and DPLLs 6 of the present invention illustrated in FIG. 4 is not consistent with standard digital input/output known in the art. Additionally, ADSL transceiver 34 may include any number of other modules, which are not shown herein, such as a processor interface, timing ports, control ports, test ports, and any number of other modules.

Figure 5:
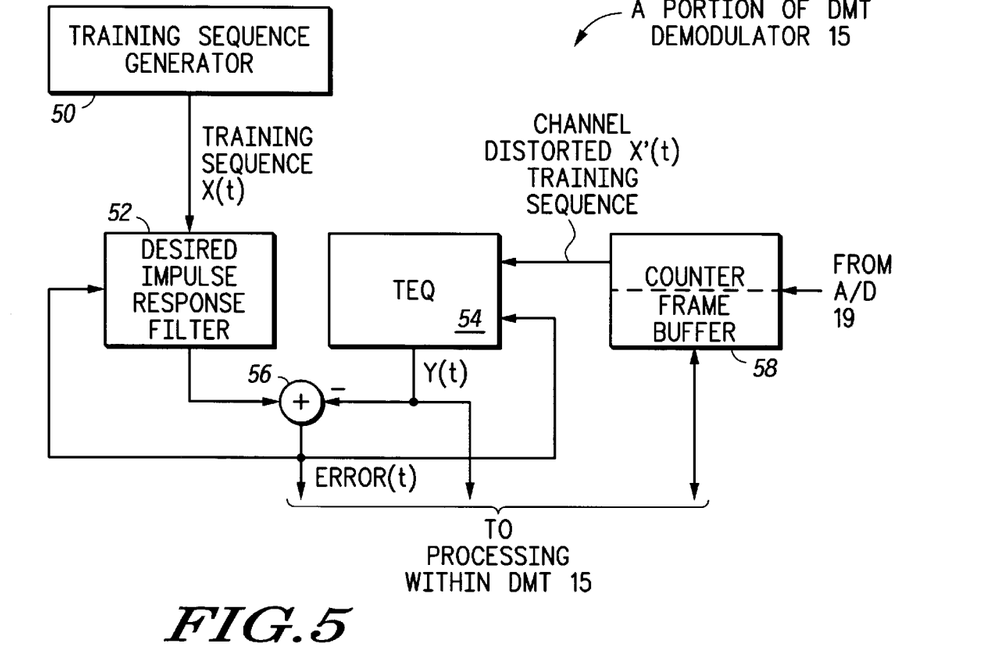
FIG. 5 illustrates, in a block diagram form, a portion of a DMT receiver, in accordance with one embodiment of the present invention.
Figure 8:
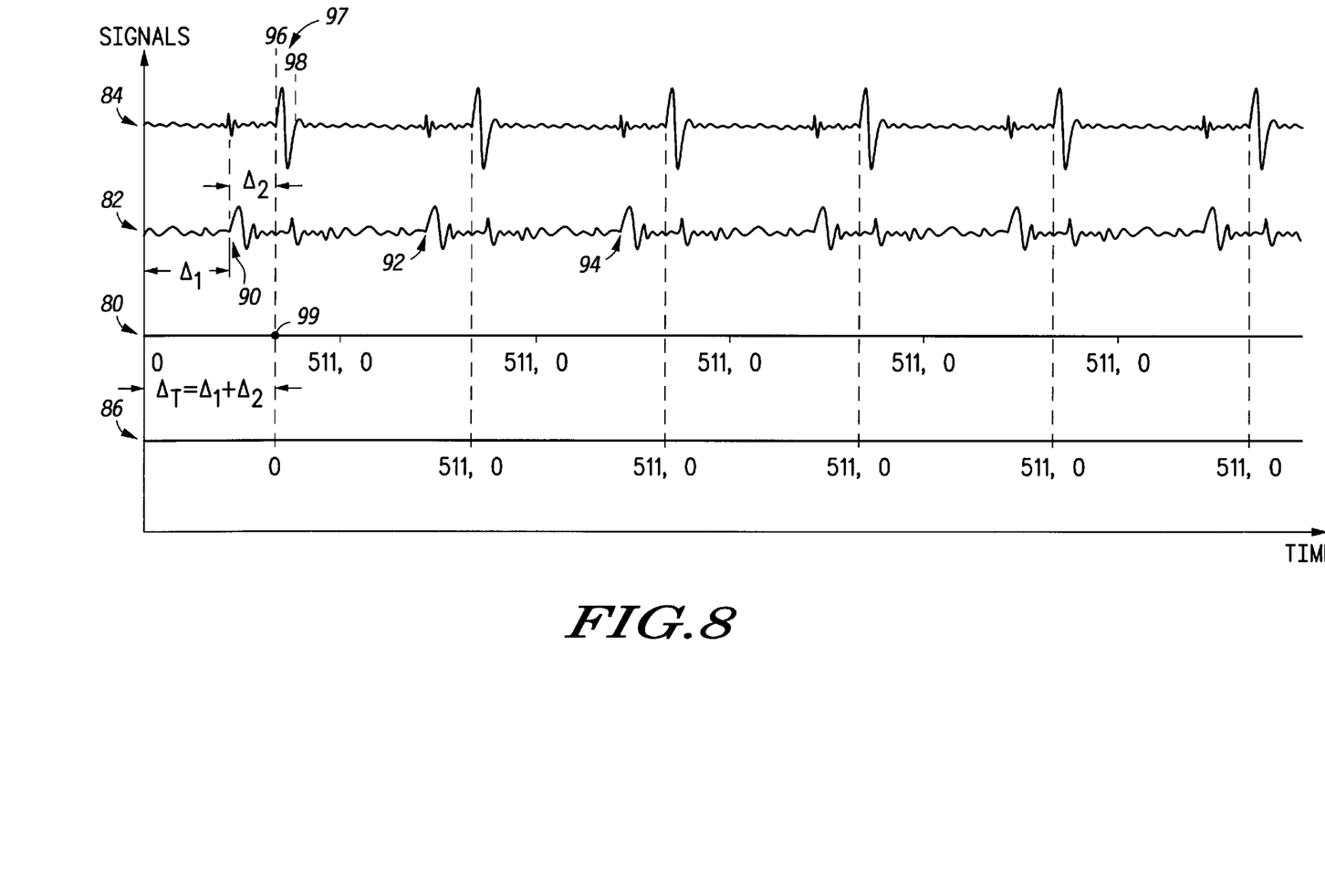
FIG. 8 illustrates, in timing diagram form, the results of using a methodology for reducing inter-symbol interference and performing frame synchronization in an ADSL system, in accordance with one embodiment of the present invention.

A more detailed description of the operation of a portion df DMT demodulator 15 from FIG. 4 is illustrated in FIG. 5. FIG. 5 illustrates the portion of DMT demodulator 15 which is used to implement the TEQ training algorithm to reduce inter-symbol interference in time-adjacent DMT frames/symbols. Training sequence generator 50 is coupled to desired impulse response filter 52. Training sequence generator 50 provides a training sequence x(t) to desired impulse response filter 52. Note that training sequence x(t) is also illustrated in FIG. 8 as signal 82. Desired impulse response filter 52 outputs a signal to adder 56. Counter 58, which receives training sequence information from A/D 19, includes a frame buffer for storing sequential information. Upon receiving inputs from A/D 19, counter 58 counts from 0 to 511 during a training mode and from 0 to 543 during a data transmission mode. The training mode occurs first and is used at the initiation of ADSL transmission. The data transmission mode then follows the training mode. In one embodiment of the present invention, counter 58 stores and/or indexes samples in the frame buffer, where storage begins at 0 and continues to either 511 or 543 dependent on the operation mode, (i.e. training or data mode).

Counter 58 provides a channel distorted training sequence x'(t) to TEQ 54. TEQ 54 equalizes channel distorted training sequence x'(t) and outputs an equalized sequence y(t). The equalized sequence y(t) is negated and provided to adder 56. Adder 56 adds the output of desired impulse response filter 52 to the negated equalized sequence y(t) and outputs an error signal, error (t). The error signal is provided as feedback to desired impulse response filter 52 and TEQ 54. This feedback of error (t) allows for the parameters of the desired impulse response filter 52 and TEQ 54 to be iteratively updated and adjusted until the error signal converges to a predetermined convergence value, typically within a tolerance range of values. The equalized sequence y(t) is then provided for post processing within DMT demodulator 15. The purpose of the time domain equalizer TEQ is to reduce the overlap between time-successive frames of DMT data. This overlap, referred to as inter-symbol or inter-frame interference, is often a result of transmission line reflection, capacitance, and delay. The overlap causes data corruption if not properly equalized.

Figure 6:
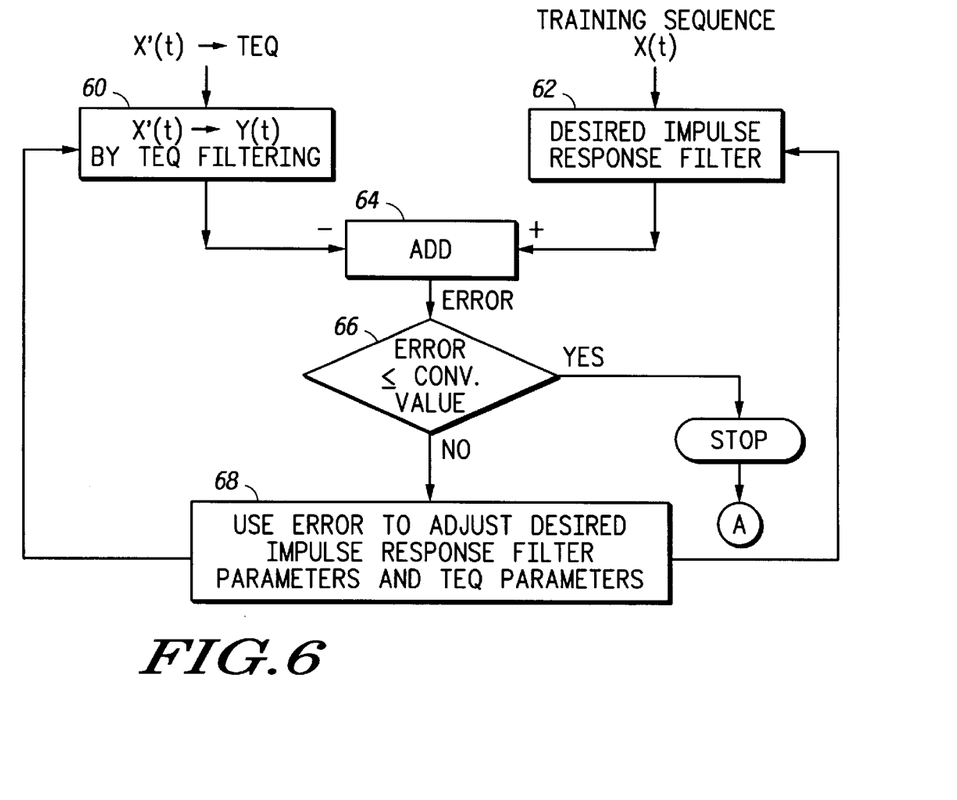
FIG. 6 illustrates, in block diagram form, a method for training a time domain equalizer (TEQ) in accordance with one embodiment of the present invention.

The training algorithm used to train TEQ 54 is illustrated in FIG. 6, where channel distorted sequence x'(t) is provided to TEQ 54 from A/D 19. The operation of TEQ 54 is illustrated in step 60 where x'(t) is equalized to equalized signal y(t) by TEQ 54 filtering. Training sequence x(t), provided by training sequence generator 50 of FIG. 5, is then provided to desired impulse response filter 62. The negation of the equalized sequence y(t) is added to the output of desired impulse response filter 52 in step 64. The result and comparison is the error signal error (t). Step 66 determines if error (t) is less than or equal to a convergence value or threshold. If error (t) is less than or equal to a convergence value at step 66, the training sequence ends and processing continues to FIG. 7. If error (t) is not less than or equal to a convergence value at step 66, processing proceeds to step 68 where the error(t) is used to adjust parameters of desired impulse response filter 52 and TEQ 54. The training described in FIG. 6 continues until the error signal, error (t), is within the convergence value.

Figure 7:
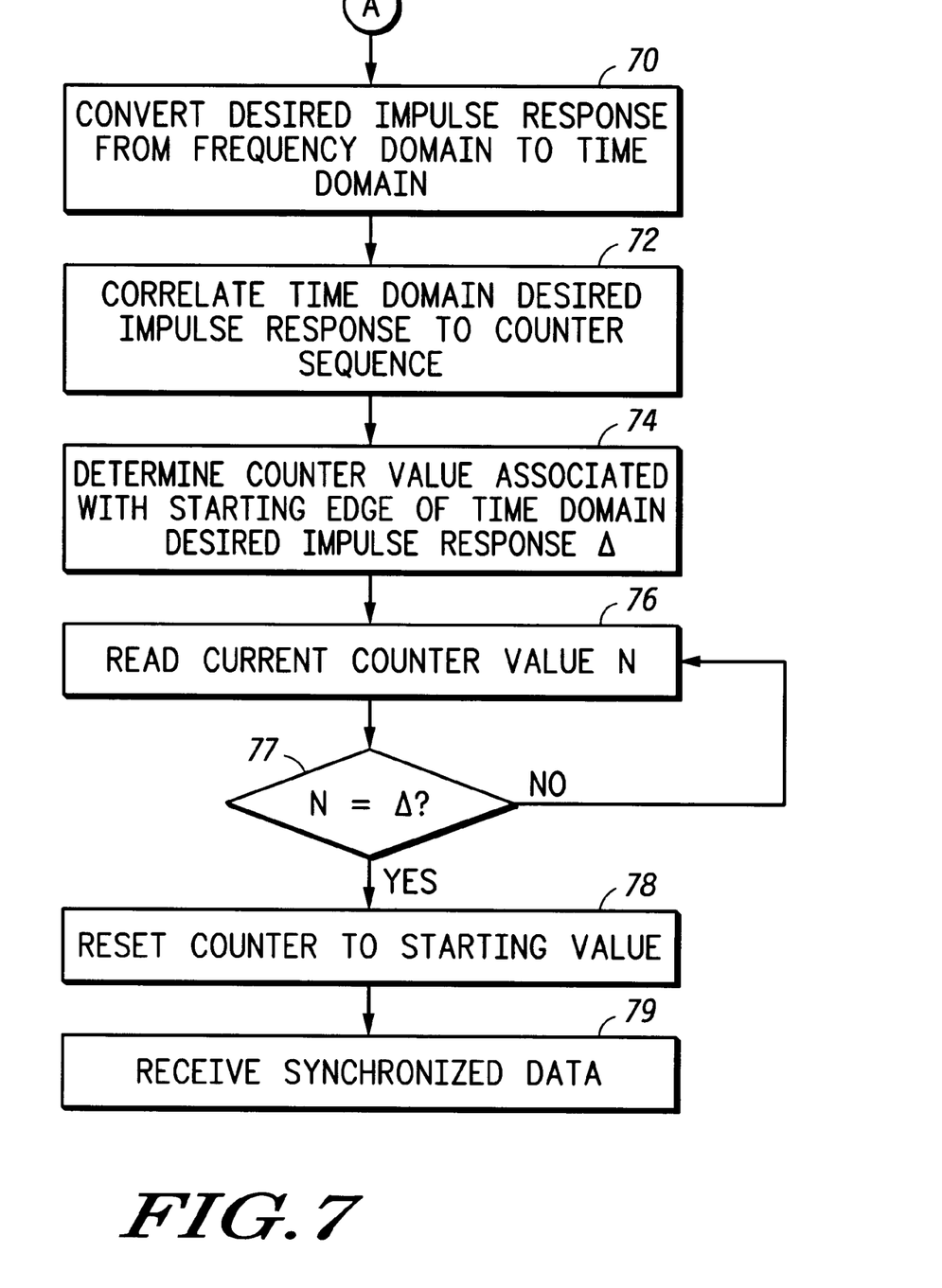
FIG. 7 illustrates, in flow chart form, a method for performing frame synchronization in an ADSL system, in accordance with one embodiment of the present invention.

In FIG. 7, once the error signal converges to within the convergence value in FIG. 6, processing proceeds to step 70 where the desired impulse response is converted from the frequency domain to the time domain. Continuing to step 72, a correlation is done to associate the time domain desired impulse response to a counter sequence. Referring also to FIG. 8, where the desired impulse response 84 is correlated or stored in memory while indexed to the counter sequence 80. Note that at this point the counter is not synchronized in time with the training signal.

Continuing to step 74, a counter value associated with the starting edge of the time domain desired impulse response is determined, as seen at point 99 of FIG. 8. This counter value is equal to the misalignment and is generally represented by time $\Delta_T$. Time $\Delta_T$ is a measure of the inherent misalignment between the transmitter clocks/counters and the receiver clocks/counters, as seen in $\Delta_1$ of FIG. 8, and of the inherent delay in the communication connection seen in $\Delta_2$ of FIG. 8.

Continuing to step 76, the current real-time counter value, N, is read. Note that the counter repeatedly counts from an initial value up to N, and N is a finite integer. N is a unique value which identifies the number of samples per frame. Decision step 77 determines if N is equal to the misalignment value $\Delta_T$ at point 99 of FIG. 8. If the current count value in the counter is not equal to the fixed count value stored as $\Delta_T$, then the processing returns to step 76 to again read the current counter value. Polling of the counter value in this manner continues until the current counter value is equal to $\Delta_T$. Once the equality of step 77 is satisfied, processing continues to step 78 where the counter is reset to a starting value for maintenance of frame alignment. Finally, in step 79, the system is ready to receive synchronized data.

In another form, the value $\Delta_T$ can simply be subtracted from the current counter value mod 512 without doing any polling. Effectively, after inter-symbol interference is reduced to within a predetermined tolerance and only a few additional clock cycles are needed to do frame alignment. Contrast the present invention with previous solutions which required up to 260,000 clock cycles.

FIG. 8 illustrates, in timing diagram form, the methodology performed in according to FIGS. 6 and 7. In other words, FIG. 8 illustrates in a graphical format the various signals which are being processed within the ADSL system during frame synchronization. FIG. 8 illustrates a repetitive training signal 82 which repeats every 512 samples or roughly every 250 microseconds. Training signal 82 is transmitted and received during the initialization state of an ADSL system. FIG. 8 illustrates that the training signal begins at a first time, point 90, and ends at a second time, point 92. Since the signal 82 is repetitive, the signal 82 begins again at point 92 continuing to point 94. Therefore, the training signal between points 90 and 92 is identical to the training signal located between points 92 and 94, and so on. Note that the training signal itself is defined by the ADSL standard.

FIG. 8 illustrates a counter sequence 80 which is initially seen within the receiver. Once the modem in an ADSL system is enabled or powered-up, an internal counter begins to count from 0 to 511 in a cyclic manner as illustrated via line 80 of FIG. 8. The training sequence is used to initiate control of data frame sampling. Since the input training signal can be received at the transceiver at any point in time, the beginning of the training sequence 90 will most likely be misaligned with the counter start value 0 of line 80 by some distance, illustrated as $\Delta 1$ in FIG. 8.

A time domain desired impulse response 84 is iteratively calculated such that the width of the impulse 97 is less than 33 samples of the counter line 80 in FIG. 8. To minimize intersymbol interference, the impulse portion 97 of FIG. 8 (i.e. the time between points 96 and 98) is to have a width less than or equal to 33 count values. Note that it may be helpful to refer to lines 80 and 86, which each have a correspondence to desired impulse response 84. Line 80 illustrates the initial samples taken at the receiver of desired impulse response 84. Referring to line 80, point 99 is positioned at time point 96. The width of impulse response portion 97 should be contained within 33 count values, where the 33 count values are samples counted from point 99 on line 80. Note that the sample count of line 80 is misaligned with respect to desired impulse response 84. Specifically, the sample count at point 99, and effectively corresponding to time point 96, is not 0 and is not 511. This presents a problem, as point 96 is the start of the impulse portion 97 and should be where the sample count begins.

Line 86 illustrates the adjusted or synchronized sampling at the receiver, where time point 96 corresponds to sample count 0. In other words, sample count 0 after synchronization, as illustrated in line 86 corresponds to point 96 of the impulse response portion 97.

The impulse response portion 97 of FIG. 8 has a starting point 96 and an ending point 98. The difference in time between point 90 and starting point 96 is labeled as $\Delta_2$, and shows the delay time of the ordinary telephone line used to communicate the training signal 82 of FIG. 8. The algorithm used to calculate the desired impulse response in desired impulse response 84 and equalize parameters in order to reduce inter-symbol interference is discussed in U.S. Pat. No. 5,285,474, by Chow et al, cited herein above. The desired impulse response 84 in FIG. 8 is used to determine the difference between the zero value of the counter of line 80 and the starting edge 96 of the impulse 97. This total delay $\Delta_T$ is the sum of $\Delta_1$ and $\Delta_2$ as illustrated in FIG. 8.

$\Delta_T$ can be identified as the fixed count value 99 on line 80 which coincides with the starting edge of the impulse response portion 97. In other words, $\Delta_T$ in FIG. 8 is approximately the value of sample 280 along line 80 of FIG. 8. The present invention uses the value $\Delta_T$, illustrated as point 99 in FIG. 8, in an ADSL system to perform quick and efficient frame synchronization. In order to perform the frame synchronization, the counter sequence of line 80 of FIG. 8 is monitored by the ADSL system. Once a point 99 is found, in any of the cycles illustrated on line 80, it triggers a sample count reset to a starting value of zero, illustrated in line 86 of FIG. 8. Performing a sample count reset at point 99 of line 80, results in a new count sequence for the ADSL system, illustrated on line 86. As is clearly illustrated in FIG. 8, the new count sequence 86 is synchronized with incoming data, where the resultant sampling described by line 86 includes compensation for delay times, $\Delta_T$ and $\Delta_2$. In another embodiment of the present invention, the value of $\Delta_T$ can simply be subtracted from the current value of the counter mod 512 to achieve a similar result in fewer clock cycles.

According to one embodiment of the present invention, an asymmetric digital subscriber line (ADSL) frame synchronizer is stored on a computer readable medium. The frame synchronizer includes computer instructions used to digitally sample a training signal provided as input to the frame synchronizer. The sampling is performed at selected intervals to derive a desired frequency domain impulse response. The desired frequency domain impulse response ensures that any inter-symbol interference within frames of the training signal is within a specified tolerance. The frame synchronizer further includes computer instructions used to convert the desired frequency domain impulse response to a desired time domain impulse response. The frame synchronizer also includes computer instructions used to determine a frame misalignment value ($\Delta$) from the desired time domain impulse response. The frame synchronizer also includes computer instructions used to adjust the counter to compensate for the frame misalignment value ($\Delta$) to achieve frame synchronization within an ADSL system.

The present invention reduces the initialization time of a receiver in an ADSL system, by combining functions typically performed separately. By combining interference reduction and synchronization, the set up time of an ADSL receiver is made more efficient and timely. Note that after synchronization, the ADSL system performance is oblivious to the method of initialization.

While the present invention has been illustrated and described with reference to specific embodiments, further modifications and improvements will occur to those skilled in the art. For example, plurality as used herein is intended to mean any number between two and infinity and should not be limited to any particular constant or sub-range. Note that the 512 samples and 250 frequency carriers are specific ADSL examples and the frame alignment technique taught herein can be used for any ADSL sample algorithm and any communication system. It is to be understood, therefore, that this invention is not limited to the particular forms illustrated and that it is intended in the appended claims to cover all modifications that do not depart from the spirit and scope of this invention.

What is claimed is:

1. A method for performing frame synchronization and inter-symbol interference reduction in a communication system, the method comprising the steps of:

receiving a training signal at a receiver of the communication system, the receiver having a counter which counts from one to N, where N is a finite integer defining a block of data;

digitally sampling the training signal to form a sampled training signal;

providing the sampled training signal to the counter;

the counter providing blocks of the sampled training signal to a time domain equalizer (TEQ);

training the TEQ, whereby a desired impulse response is determined which ensures that any inter-symbol is within a specified tolerance;

determining a first value of the counter corresponding to a starting edge of the desired impulse response during a first block of the sampled training signal; and determining a frame misalignment value ($\Delta$) using the desired impulse response and the first value of the counter; and adjusting the counter using the frame misalignment value ($\Delta$) to achieve frame synchronization within the communication system.

2. The method of claim 1 wherein the communication system is an asymmetric digital subscriber line (ADSL) system.

3. The method of claim 1 wherein the counter is reset to a starting value when the frame misalignment value ($\Delta$) is detected within the counter whereby frame alignment is achieved.

4. The method of claim 1 wherein the counter repeatedly counts from an initial value to N wherein N is a finite integer, a unique value of the counter identifying a unique symbol sample time period for one symbol of data communicated in the communication system.

5. The method of claim 1 wherein the step of digitally sampling the training signal is used to configure the time domain equalizer so that inter-symbol interference is minimized within the communication system.

6. A method for performing frame synchronization and reduction of inter-symbol interference in an asymmetric digital subscriber line (ADSL) system, the method comprising the steps of:

providing a training signal to a receiver of the asymmetric digital subscriber line (ADSL) system, the receiver having a counter which counts from one to N to enable sampling of the training signal at selected intervals within the receiver;

digitally sampling the training signal via an analog to digital converter located within the receiver, digital sampling being performed at the selected intervals defined by the counter and resulting in digitally sampled data;

deriving a desired impulse response from the digitally sampled data using frequency domain analysis;

iteratively changing equalizer settings of an equalizer internal to the receiver to iteratively reduce any inter-symbol interference within the training signal to within a specified tolerance;

converting the desired impulse response from frequency domain to time domain to result in a time domain desired impulse response;

determining a frame misalignment value ($\Delta$) using the time domain desired impulse response and the counter, wherein the frame misalignment value ($\Delta$) corresponds to a count of the counter on a starting edge of the desired impulse response during a first sample of the training signal; and adjusting the counter using the frame misalignment value ($\Delta$) and the count of the counter to achieve frame synchronization within the asymmetric digital subscriber line (ADSL) system.

7. The method of claim 6 wherein the training signal comprises a plurality of frequency carriers at different frequencies, each frequency carrier in the plurality of frequency carriers communicating at least one bit of data.

8. The method of claim 6 further comprising the additional steps of:

terminating the training signal; and receiving a data signal instead of the training signal wherein the step of changing a value in the counter ensures proper alignment and sampling of the data signal within the asymmetric digital subscriber line (ADSL) system.

9. The method of claim 8 wherein N is changed to M wherein M is a finite integer greater than N whereby symbols associated with the data signal are greater in time length than symbols associated with the training signal.

10. The method of claim 6 wherein the step of changing a value in the counter comprises:

resetting the counter to a starting value when the frame misalignment value ($\Delta$) is detected as a value stored in the counter.

11. The method of claim 6 wherein the step of determining a frame misalignment value ($\Delta$) comprises:

identifying a point on the time domain desired impulse response; and storing a counter value resident within the counter when the point is detected on the time domain desired impulse response, the counter value being used as the frame misalignment value ($\Delta$).

12. A method for synchronizing data frames in an asymmetric digital subscriber line (ADSL) system having a time-domain equalizer (TEQ) that is iteratively trained using a desired impulse response filter and having a sample counter, the method comprising:

converting a frequency-domain impulse response generated by the desired impulse response filter to a time-domain impulse response;

correlating the time-domain impulse response to a sample counter sequence;

determining a sample counter value associated with a starting edge of the time-domain impulse response;

reading a first sample counter value;

comparing the first sample counter value to the sample counter value associated with the starting edge of the time-domain impulse response; and if the first sample counter value is equal to the sample counter value associated with the starting edge of the time-domain impulse response resetting the sample counter to the sample counter value associated with the starting edge of the time-domain impulse response.

13. A method as in claim 12, wherein the step of converting the frequency-domain impulse response is done using an Inverse Fast Fourier Transform.

14. A method as in claim 12, further comprising the step of:

if the first sample counter value is not equal to the sample counter value associated with the starting edge of the time-domain impulse response:

reading a second sample counter value from the sample counter;

comparing the second sample counter value to the sample counter value associated with the starting edge of the time-domain impulse response; and if the second sample counter value is equal to the sample counter value associated with the starting edge of the time-domain impulse response resetting the sample counter to the sample counter value associated with the starting edge of the time-domain impulse response.

15. A method as in claim 12, wherein the time-domain equalizer (TEQ) iterative training includes the following steps:

the desired impulse response filter receiving a training sequence, x(t);

the time-domain equalizer (TEQ) receiving a distorted training sequence, x'(t) which is a distortion of the training sequence, x(t);

the TEQ providing a first equalized sequence;

the desired impulse response filter providing a filtered training sequence;

determining a first difference value by comparing the first equalized sequence to the filtered training sequence; and if the first difference value is not within a predetermined convergence value adjusting internal parameters of the TEQ.

16. A method as in claim 15, further including the step of:

if the first difference value is not within a predetermined convergence value adjusting filter parameters of the desired impulse response filter.

17. A frame synchronizer for synchronizing data frames in an asymmetric digital subscriber line (ADSL) system, the frame synchronizer having a counter which allows data frames to be sampled a plurality of times, the frame synchronizer comprising:

a time-domain equalizer (TEQ) which receives a channel distorted signal;

means for processing the channel distorted signal to change equalizer values within the time-domain equalizer (TEQ) of the asymmetric digital subscriber line (ADSL) system to reduce inter-symbol interference of the channel distorted signal, the means for processing providing a frequency domain response;

means for converting the frequency domain response to a time domain response in order to determine a frame misalignment value $\Delta$ from the time domain response, the frame misalignment value $\Delta$ being a difference between a starting value of the counter and selected time point of the time domain response; and adjusting circuitry for changing a starting point of a counter sequence of the counter so that sampling of data frames is synchronized.

18. A frame synchronizer as in claim 17, wherein the frequency domain response is a desired impulse response.

19. An asymmetric digital subscriber line (ADSL) frame synchronizer stored on computer readable medium, the frame synchronizer comprising:

computer instructions used to digitally sample a training signal provided as input to the frame synchronizer, the sampling being performed at selected intervals to derive a desired frequency domain impulse response, the desired frequency domain impulse response ensuring that any inter-symbol interference within frames of the training signal is within a specified tolerance;

computer instruction used to convert the desired frequency domain impulse response to a desired time domain impulse response computer instructions used to determine a frame misalignment value ($\Delta$) from the desired time domain impulse response; and computer instructions used to adjust the counter to compensate for the frame misalignment value ($\Delta$) to achieve frame synchronization within an ADSL system.

* * * * *